UNITED STATES PATENT OFFICE.

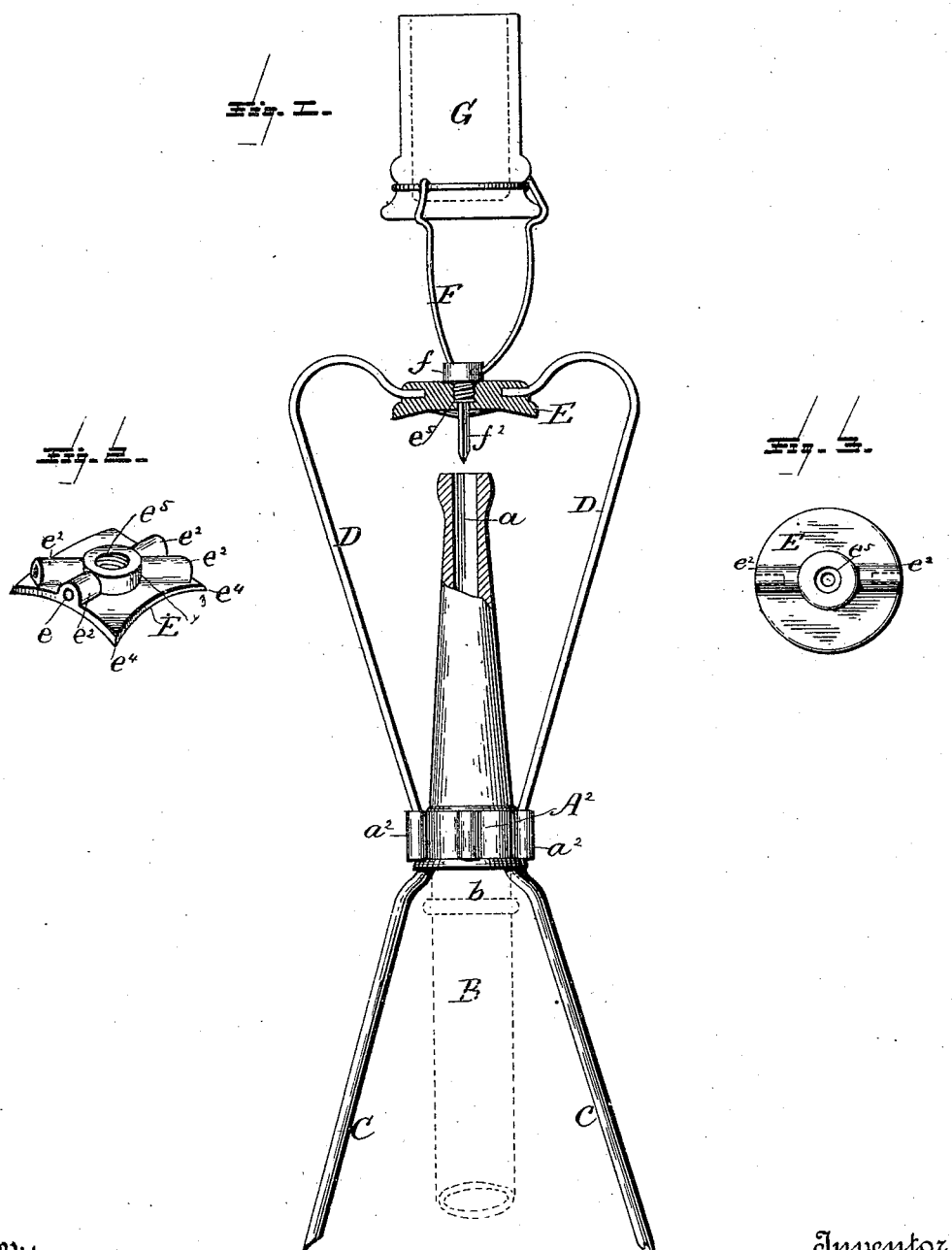

GEORGE B. SMITH, OF ST. CLOUD, MINNESOTA.

SPRINKLER.

SPECIFICATION forming part of Letters Patent No. 459,449, dated September 15, 1891.

Application filed June 9, 1891. Serial No. 395,638. (No model.)

*To all whom it may concern:*

Be it known that I, GEORGE B. SMITH, a citizen of the United States, residing at St. Cloud, in the county of Stearns, State of Minnesota, have invented certain new and useful Improvements in Sprinklers, of which the following is a specification, reference being had therein to the accompanying drawings.

The objects of my improvement are to provide a lawn-sprinkler of ornamental appearance and capable of producing a spray, the peripheral edge of which is in the form of a square and is well adapted for spraying the edge of a terrace or of a lawn without dampening the walks or the side of a house in proximity to which it may be set.

Another object is to easily transform the device so as to adapt it to throw a horizontal or an inclined spray in connection with a central vertical jet.

I attain these objects by the construction illustrated in the accompanying drawings, in which—

Figure 1 is a side view, partly in section, of a lawn-sprayer constructed in accordance with my invention. Fig. 2 is a perspective view of a jet-deflector having a square edge. Fig. 3 is a similar view of a circular jet-deflector.

In said drawings, A represents a nozzle similar in some respects to the nozzle used in connection with garden-hose, but with its delivery-opening $a$ preferably of square form. Its widest end is internally screw-threaded, as usual, to receive the metal coupling $b$ of the hose B. Said end of the nozzle is provided with a wide collar $A^2$, either made of sufficient thickness or provided with lateral bosses $a^2$, that are axially perforated to form sockets for the reception of the upper end of rods forming the tripod or legs C, that support the nozzle in a vertical position. Said legs are preferably two or more feet in length, and have their lower ends pointed to be easily forced into the sod of a lawn. The collar $A^2$ of the nozzle has also vertical sockets in its sides to receive two spring-wire fingers D, the upper ends of which are bowed and inwardly bent toward the axis of the device and enter sockets $e$, formed in radial bosses $e^2$, formed upon the jet-deflector E. Said deflector is preferably of rectangular form, as clearly shown in Fig. 2, and has its under surface either plain or slightly corrugated, but with its corners $e^4$ bent down to divide the spray into four sections or sheets of spray, each having its outer end reaching the ground on a line substantially parallel with each edge of the square deflector; but as the deflector is pivotally mounted upon the ends of the wire fingers D it can be slightly turned or tilted on said fingers as journals therefor, so that the spray can be made to reach farther upon one side than upon the other. If a uniformly-circular spray is desired, the disk shown in Fig. 3 can be substituted for the square deflector shown in Fig. 2.

To add to the appearance and the capabilities of the device, the deflector is provided with a central boss $e^3$, having an axial perforation $e^5$, the upper end of which is screw-tapped to receive the body of a screw $f$, to the head of which are attached three branching wires F, forming the support for a bouquet-holder G, that is in this case of cylindrical form, with an enlarged base clasped by the upper ends of the branching wires F, and in said bouquet-holder a small bouquet can be placed when the device is in use. The end of the screw $f$ has preferably a square point $f^2$, that extends through the perforation $e^5$ of the deflector toward the square opening in the end of the nozzle to help to equally divide into four parts the water-jet issuing therefrom.

If it is desired to have the device produce not only a horizontal spray, but also a vertical jet, the bouquet-holder and its screw-base $f$ are removed from the deflector to allow a central jet to issue also from the axial perforation therein.

Having now fully described my invention, I claim—

1. A sprinkler consisting of a nozzle having a broad collar, a support secured thereto to retain it in a vertical position, spring-wire fingers secured to the broad collar of said nozzle and pivotally connected to the deflector, a square deflector adjustably retained by said fingers and having an axial perforation, and a bouquet-holder secured to said deflector, substantially as described.

2. In a sprinkler, the combination of a nozzle having a broad coupling-collar, a support secured thereto to retain it in a vertical position, wire fingers secured to the coupling-collar of said nozzle, and a deflector adjustably retained by frictional resistance of said fingers and having an axial perforation screw-threaded and a screw therein, substantially as described.

3. In a sprinkler, the combination of a nozzle having a broad coupling-collar, a support secured thereto to retain it in a vertical position, wire fingers secured to the coupling-collar of said nozzle, and a deflector adjustably retained at any angle by said fingers, substantially as described.

In testimony whereof I affix my signature in presence of two witnesses.

GEORGE B. SMITH.

Witnesses:
ANDREW C. ROBERTSON,
L. A. EVANS.